United States Patent
Ishitani

(10) Patent No.: US 6,721,451 B1
(45) Date of Patent: Apr. 13, 2004

(54) APPARATUS AND METHOD FOR READING A DOCUMENT IMAGE

(75) Inventor: Yasuto Ishitani, Matsudo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 651 days.

(21) Appl. No.: 09/650,750

(22) Filed: Aug. 30, 2000

(30) Foreign Application Priority Data

May 31, 2000 (JP) ........................................ 2000-163784

(51) Int. Cl.$^7$ ................................................. G06K 9/00
(52) U.S. Cl. ........................ 382/181; 382/175; 382/177; 382/180; 382/306; 715/520; 715/521; 715/537
(58) Field of Search ............................... 382/173–177, 382/180, 190, 224–225, 290, 306; 715/514, 517–525

(56) References Cited

U.S. PATENT DOCUMENTS

| | | | | |
|---|---|---|---|---|
| 5,757,963 A | * | 5/1998 | Ozaki et al. | 382/209 |
| 5,765,176 A | * | 6/1998 | Bloomberg | 715/514 |
| 5,930,811 A | * | 7/1999 | Nojima et al. | 715/517 |
| 6,157,738 A | * | 12/2000 | Wang | 382/199 |
| 6,466,954 B1 | * | 10/2002 | Kurosawa et al. | 715/520 |
| 6,562,077 B2 | * | 5/2003 | Bobrow et al. | 715/517 |

FOREIGN PATENT DOCUMENTS

| | | |
|---|---|---|
| JP | 06-103402 | 4/1994 |
| JP | 9-101959 | 4/1997 |
| JP | 11-250041 | 9/1999 |
| JP | 2000-029877 | 1/2000 |

OTHER PUBLICATIONS

Kise, K. et al., "Organizing Knowledge–Base for Structure Analysis of Document Images", Transactions of Information Processing Society of Japan, vol. 34, No. 1, pp. 75–87, (1993).
Ishitani, Y., "Logical Page Analysis Based on Emergent Computation—Digitization of Existing Documents Using Document Reading System", Technical Report of IEICE, DE 98–8 (1998–5), The Institute of Electronics, Information and Communication Engineers, pp. 55–62, (1998).
Ishitani, Y., "Logical Analysis of Document Images Based on Emergent Computation", Proceedings of International Conference on document Analysis and Recognition, pp. 189–192, (1999).

* cited by examiner

Primary Examiner—Bhavesh M. Mehta
Assistant Examiner—Gregory Desire
(74) Attorney, Agent, or Firm—Finnegan, Henderson, Farabow, Garrett & Dunner, L.L.P.

(57) ABSTRACT

A character line is identified with a keyword included in the relevant logical element of a keyword dictionary, and the identification result is output to a "keyword identification part" to store the result. All the character lines processed through a "division process part" are output to a "tagging modification part" to replace tags so that there is no logically inconsistent in adjacent character lines, when tags given to adjacent character lines are in logically inconsistent as a combination of tags. A character line to which an appropriate tag may not be given in the "tagging modification part" is output to an "indecisive tag estimation part" where an appropriate tag is estimated and is given with reference to a tag adjacent the character lines. The process in the "indecisive tag estimation part" is applied to all the character lines, and repeated till there is no replacement of tags. Thereby, desired information with desired tags given may be extracted from printed documents and automatically input to a computer system.

16 Claims, 12 Drawing Sheets

DEFINITION OF A KEYWORD DICTIONARY:

LOGICAL ELEMENT NAME: ⎯⎯⎯⎯⎯⎯
STARTING TAG NAME: ⎯⎯⎯⎯⎯⎯⎯
TERMINATING TAG NAME: ⎯⎯⎯⎯⎯
MASTER TAG NAME: ⎯⎯⎯⎯⎯⎯⎯⎯
SLAVE TAG NAME: ⎯⎯⎯⎯⎯

DEFINITION OF KEYWORDS:

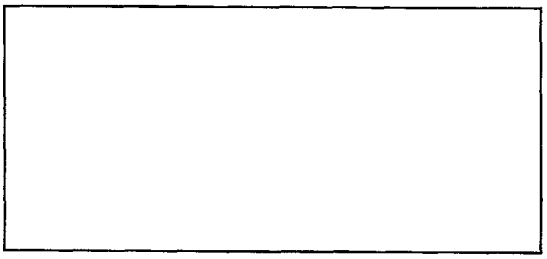

FIG. 6

DISPLAY OF LOGICAL ELEMENTS AT THE SAME LAYER IN A HIERARCHY:

NAME, AFFILATED ORGANIZATION, BELONGING DEPARTMENT, POSITION, ADDRESS, TELEPHONE NIMBER, FAX NUMBER, EMAIL ADDRESS, AND HOME PAGE ADDRESS

ORDERRING:

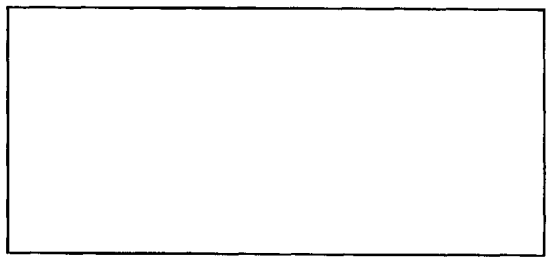

FIG. 7

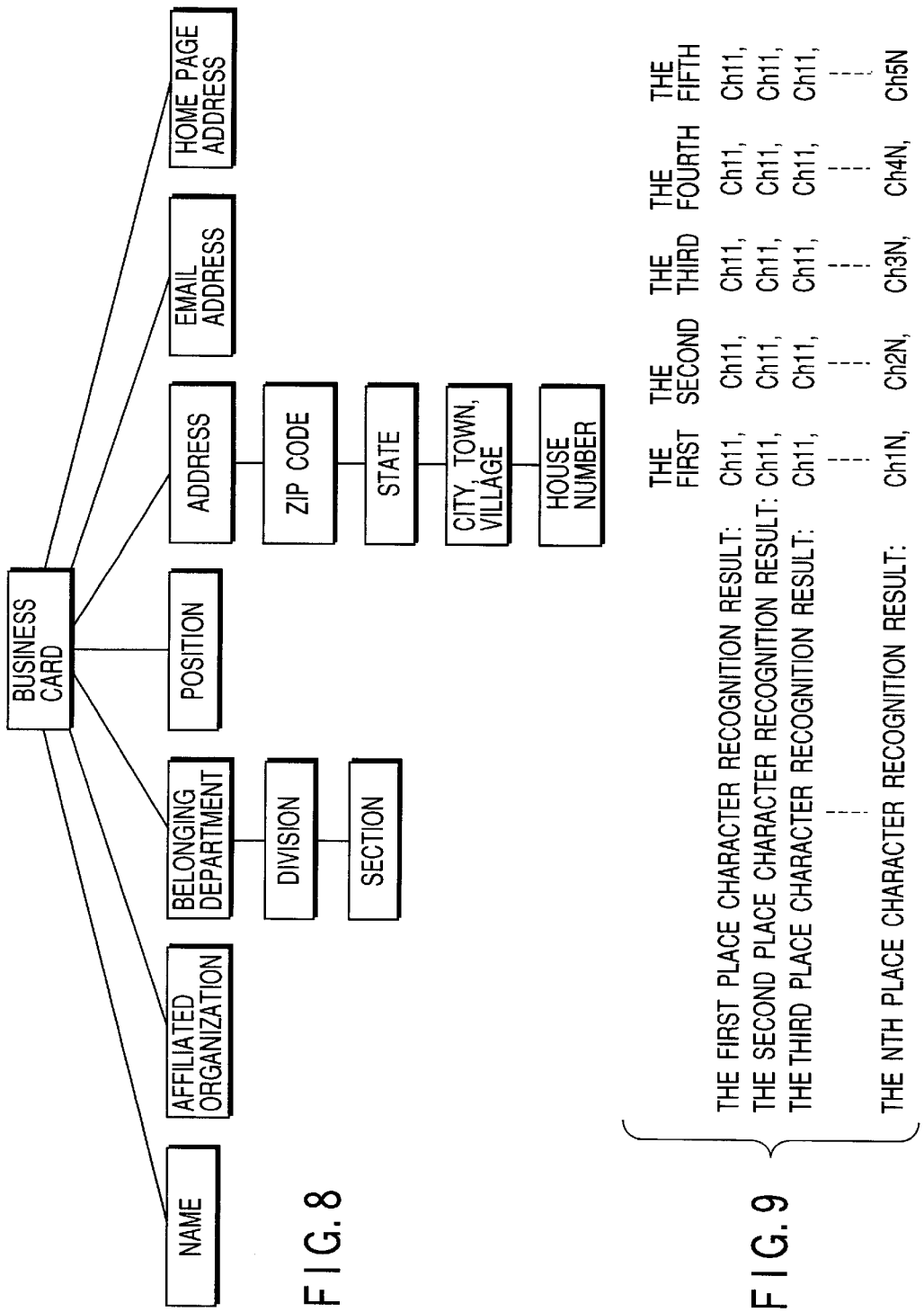

F I G. 12A
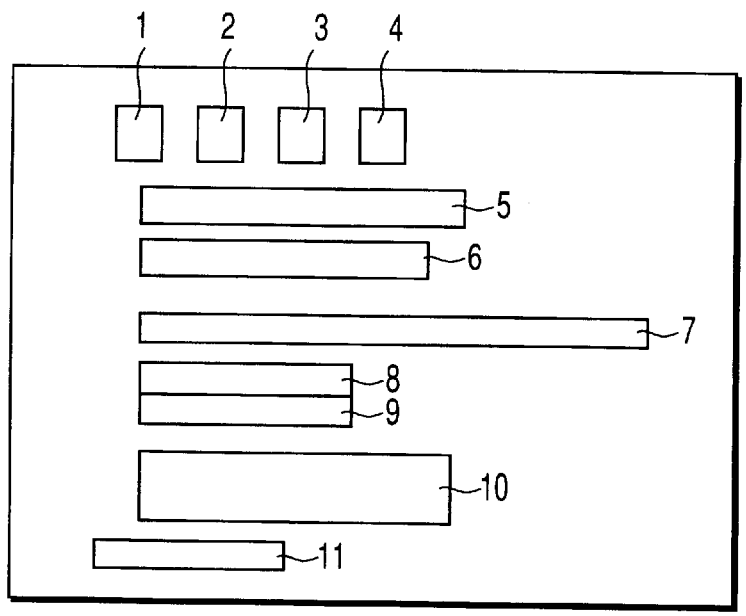
F I G. 12B

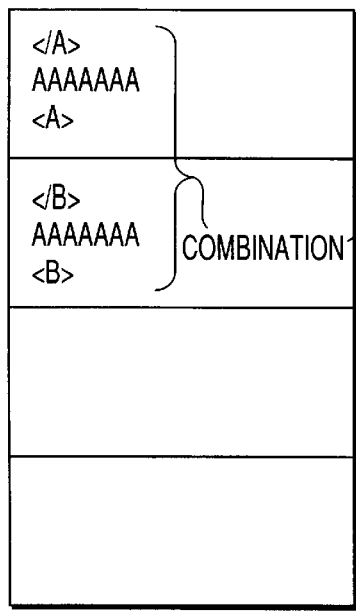
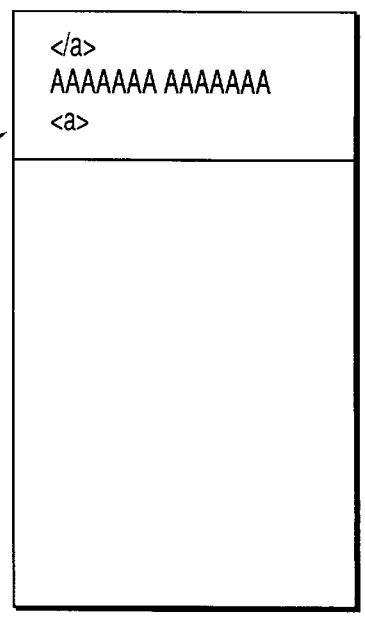
FIG. 14A  FIG. 14B
FIG. 15A
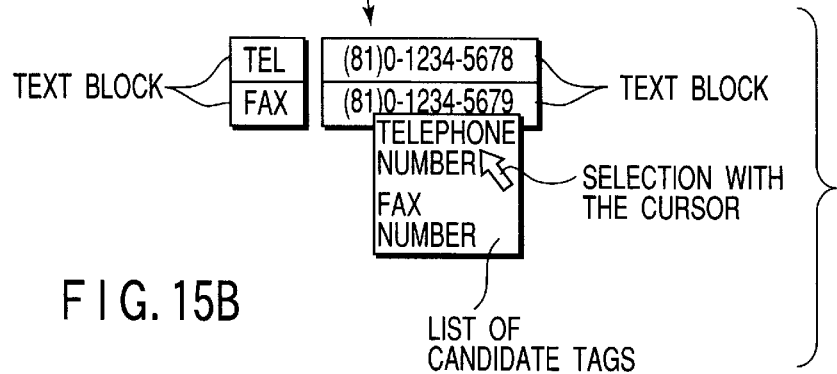
FIG. 15B

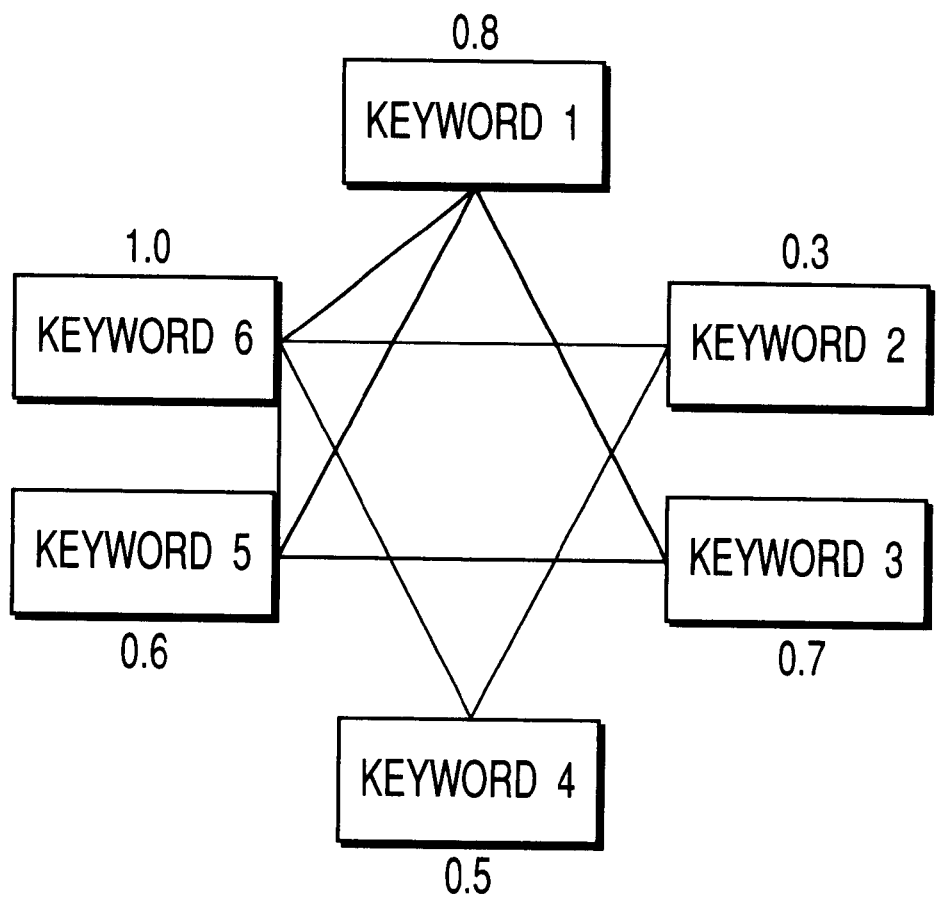
F I G. 18

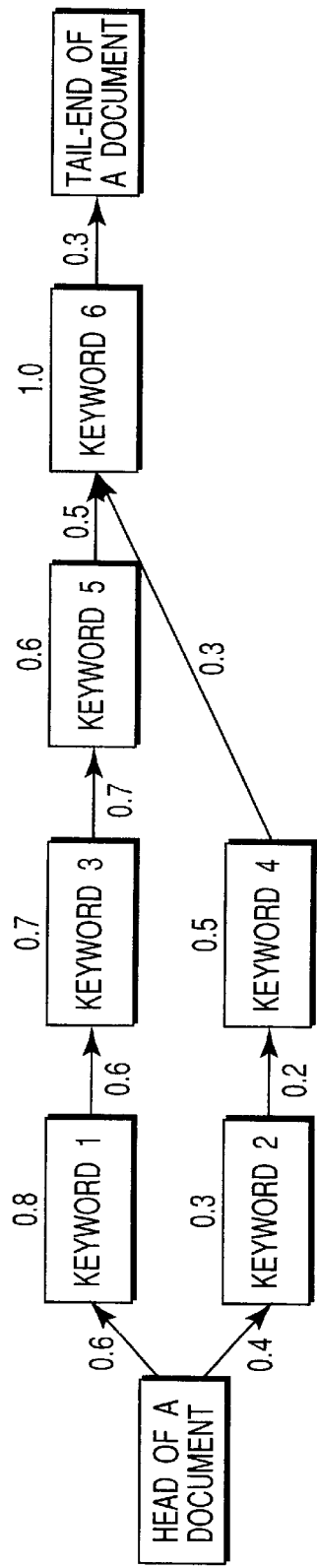
F I G. 19

… (US 6,721,451 B1)

APPARATUS AND METHOD FOR READING A DOCUMENT IMAGE

CROSS-REFERENCE TO RELATED APPLICATIONS

This application is based upon and claims the benefit of priority from the prior Japanese Patent Application No. 2000-163784, filed May 31, 2000, the entire contents of which are incorporated herein by reference.

BACKGROUND OF THE INVENTION

The present invention relates to apparatus and a method for reading a document image, and more particularly, to apparatus and a method for reading a document image to input a content described in a printed document into a computer by structuring the extracted content in a predetermined process.

There is apparatus for reading a document image to take a content in a printed document such as a newspaper article, a book, an office document, and an official document into a computer, and to use them as electronic information which may be usable on the computer. In the apparatus, a printed document is taken into the computer as a file. Then, a layout structure showing how a content of the document taken from the file is arranged in the document, and the logical structure showing how characters or character lines which are sets of characters are related each other in a semantics are extracted from the printed document. And, it is general that a series of process are implemented to reproduce the printed document taken into the computer by coordination of the structures.

There is a method to extract the layout and logical structures by use of close relationship between both the structures. For example, in the paper of "K. Kise, M. Yamaoka, N. Babaguchi and Y. Tezuka: Organizing Knowledge-Base for Structure Analysis of A document image, Transactions of Information Processing Society of Japan, Vol. 34, No. 1, pp. 75–87 (1993)", a document model for indicating a relationship between the layout structure and the logical structure are used. Owing to the above model, the document structure is extracted through applying a predetermined estimation to an input document. In addition, the above model has adopted a frame expression with a capability to describe a structural hierarchy. Thereby, it is possible for a layout description such as a centering to describe variations in each component of the structural hierarchy.

However, conventional apparatus for reading a document image has had such a capability as the apparatus treats printed documents only under specific layout conditions. It has been difficult to flexibly extract desired logical information by analyzing in detail all over various kinds of printed documents.

Furthermore, in the conventional apparatus, it is difficult to precisely process documents described in many languages, those having together many logical elements in one line, or those in which some characters in one line rotate 90 degrees and so on. Moreover, it is also difficult to output extracted information in a desired order or form.

BRIEF SUMMARY OF THE INVENTION

The purpose of this invention is to provide apparatus and a method for reading a document image to extract pieces of desired information with arbitrary logical elements from various kinds of documents such as business letters with a single column and newspapers with a multiple column, the documents including words written in many languages, some lines having together many logical elements, or some characters in one line rotated through 90 degrees, and to input the desired information into a computer in an arbitrary data form.

According to the present invention, there is provided:

apparatus for reading a document image including a plurality of character groups, each of the character groups having a logical element which indicates a particular logical meaning of the character group, the apparatus comprises:
  means for memorizing keywords with relation to the logical element of the document image;
  means for storing image data segments of the document image, each of the image data segments corresponding to each of the character groups having the logical element;
  means for selecting one of the image data segments;
  means for sequentially identifying each of the character groups in the image data segments with a corresponding one of the keywords extracted from the memorizing means; and
  means for sequentially applying one of tags to each of the character groups, the tags denoting a particular logical meaning related to one of the keywords.

Moreover, according to the present invention, there is provided: apparatus for reading a document image including a plurality of character groups, each of the character groups having a logical element which indicates a particular logical meaning of the character group, the apparatus comprises:
  means for memorizing keywords with relation to the logical element of the document image;
  means for storing image data segments of the document image, each of the image data segments corresponding to each of the character groups having the logical element;
  means for selecting one of the image data segments;
  means for sequentially identifying each of the character groups in the image data segments with corresponding one of the keywords extracted from the memorizing means;
  means for sequentially applying one of tags to each of the character groups, the tags denoting a particular logical meaning related to one of the keywords;
  means for storing identification data which has both of every one of the character groups and every one of the corresponding tags in each of lines, the line composed of the character group and being a row of words, numbers, or other symbols on a page of writing or in print;
  means for, when the line includes only one tag of the tags as a result of the identification data and when the one tag is applied to a character group that are arranged in a part of the line, replacing the one tag with another tag applied to a new character group that are arranged in all of the line, the another tag having the same logical meaning as the one tag;
  means for, when each of the lines includes two or more tags of the tags as a result of the identification data, repeatedly dividing the each of the lines till each of divided lines includes only one tag;
  means for, when logical inconsistency exists in an arbitrary combination of some of the tags, as a result of the identification data, replacing each of the tags applied to the each of lines and each of adjacent tags adjacent to the each of the tags, with each of different tags from the tags and each of different adjacent tags from the adjacent tags respectively, the each of different tags and the each of different adjacent tags having each of appropriate logical meanings respectively so that the combination of some of the different tags and the different adjacent tags is logically consistent; and means for, when it is impossible to apply the each of the tags, applying an appropriate tag of the tags to the each of lines, the appropriate tag being estimated with reference to tags applied to the lines adjacent to the each of lines.

Furthermore, according to the present invention, there is provided:

a method for reading a document image including a plurality of character groups, each of the character groups having a logical element which indicates a particular logical meaning of the character group, the method comprises:

memorizing keywords with relation to the logical element of the document image;

storing image data segments of the document image, each of the image data segments corresponding to each of the character groups having the logical element;

selecting one of the image data segments;

identifying sequentially each of the character groups in the image data segments with a corresponding one of the keywords extracted; and applying sequentially one of tags to each of the character groups, the tag denoting a particular logical meaning related to one of the keywords.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a template screen for being written names into by a user to define the keyword dictionary shown in FIG. 2.

FIG. 7 is a template screen for display of logical elements in the same layer of the hierarchy.

FIG. 8 is a schematic view showing a tree structure manifesting hierarchy structures of each logical element.

FIG. 9 is a schematic view showing a matrix in which there are arranged, by every character pattern and every candidate priority order, characters identified by character patterns used in a keyword identification process composed of the processing orders of the tagging part shown in FIG. 4.

FIG. 12A is a schematic view showing a business card for being input to the document image inputting part of the apparatus for reading a document image shown in FIG. 1.

FIG. 12B is a schematic view showing a processed result of the business card shown in FIG. 12A after ordered operation every character line in the layout analysis part of the apparatus for reading a document image shown in FIG. 1.

FIG. 14A is a schematic view showing an embodiment in which character lines output from the tagging part of the apparatus for reading a document image shown in FIG. 1 are erroneously divided into a tag A and a tag B.

FIG. 14B is a schematic view showing an embodiment in which the tag A and the tag B shown in FIG. 14A are combined into one tag a.

FIG. 15A is a schematic view showing the business card for being input to the document image input part of the apparatus for reading a document image shown in FIG. 1.

FIG. 15B is a schematic view showing an embodiment in which, when a user puts a cursor on a position describing a telephone number and a facsimile (FAX) one in a business card shown in FIG. 15A, a list of candidate tags is displayed, and the user may select a desirable tag with the cursor from the list.

FIG. 18 is a diagram showing which keywords shown in FIG. 17 may be simultaneously selected.

FIG. 19 is a diagram showing which keywords should be selected from keywords shown in FIG. 17, which may be simultaneously selected, in further another embodiment of the apparatus for reading a document image according to the present invention.

DETAILED DESCRIPTION OF THE INVENTION

Hereinafter, one of embodiments of apparatus for reading a document image according to the present invention will be described, referring to the attached drawings.

Figure 1:
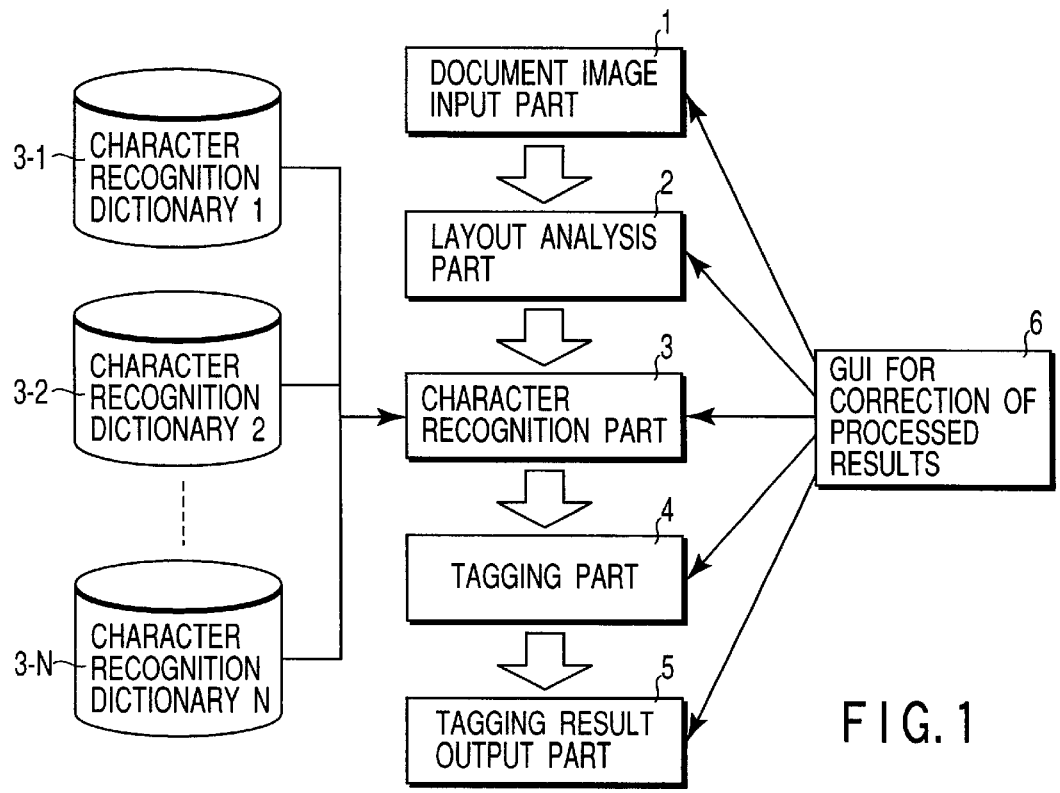
FIG. 1 is a block diagram showing the whole system of apparatus for reading a document image according to the present invention.

FIG. 1 is a block diagram showing the whole system of apparatus for reading a document image according to the present invention.

Referring to FIG. 1, a document with characters written on paper media is taken into a computer as image data in which images are converted into a data form, and input to a document image input part 1 to input the taken document by conversion to an image form usable on a computer. The processed result in the document image input part 1 is displayed on a screen. Referring to the image displayed on the screen, a user may correct the displayed image. Then, a GUI (Graphical User Interface) 6 for correction of processed results with capability to correct the input results of a document image is activated. In the GUI 6 for correction of a processed result, the image converted in the document image input part 1 is displayed. When the document is not accurately displayed as an image, the document is taken into the computer again, after changing conditions for taken-in operation of the document input to the computer. Here, the document image composed of image data segments includes groups of a character or characters (the character groups).

The image data converted into the image form usable on the computer are output to a layout analysis part 2 to extract position information of a text block, and information on each character line ordered in a reading order. Here, the text block is a set of character lines (a set of characters arranged adjacent) arranged adjacent in document elements composing a document image. The processed result in the layout analysis part 2 is displayed on the screen, and the GUI 6 for correction of a processed result with capability to correct the layout analysis results is activated. In the GUI 6 for correction of processed results, a desired layout may be edited by the user using a tool to correct parts having incorrect recognition due to errors in reading order of the document, and character lines wrongly extracted from the document.

The layout information is output to a character recognition part 3 to recognize each character pattern as a character by selection of character patterns for each character. Moreover, the character recognition part 3 is connected to a plurality of character recognition dictionaries (3-1, 3-2, ..., 3-N) to recognize character patterns as characters. The connected dictionaries are, for example, the character recognition dictionaries of Japanese, English, French, German, Italian and so on. The results processed in the character recognition part 3 are displayed on the screen. Then, the GUI 6 for correction of processed results, by which the user may correct the processed results after character recognition, referring to the images displayed on the screen, is activated. In the GUI 6 for correction of processed results, errors in each character may be corrected every character line.

Character recognition information recognized as a character, every text block, character line, or character, is output to a tagging part 4 to give a tag a logical meaning to denote general characteristics for the text block, character line, or character. The character groups have a logical element or logical elements, the logical element indicating a particular logical meaning of the character groups. The processed results in the tagging part 4 are displayed on the screen. Then, referring to the image displayed on the screen, the GUI 6 for correction of processed results, by which the user may correct the processed results after tagging, is activated. In the GUI 6 for correction of processed results, the processed results after tagging every line which is output in a predetermined form are displayed, and the user may modify the tag every line.

Document information with a tag given is output to a tagging result output part 5 to output tagging results as a desired document file in a predefined output form.

Figure 2:
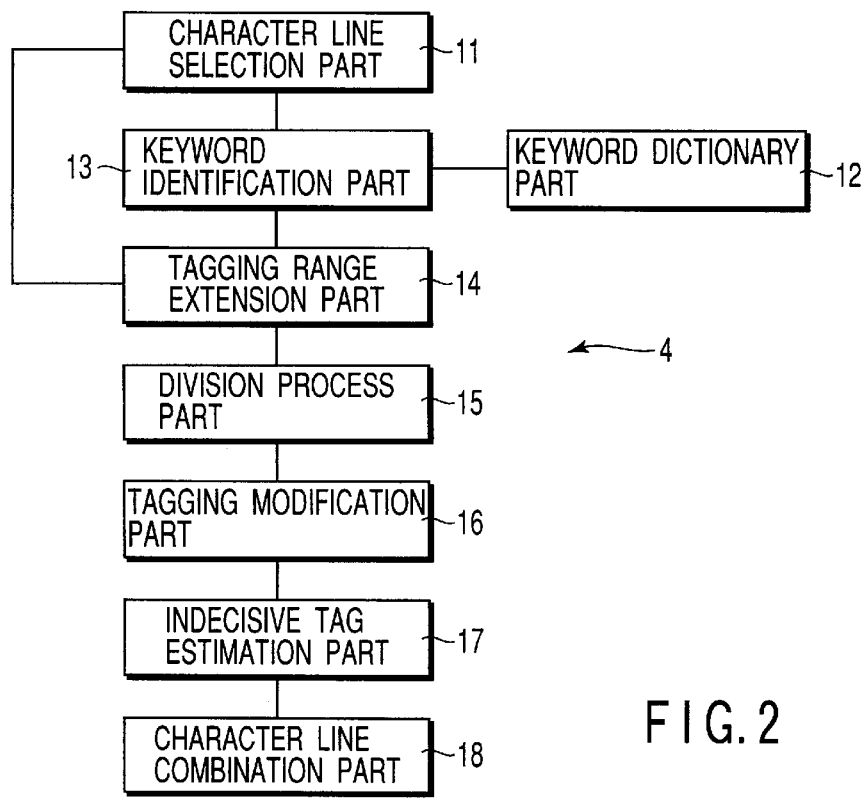
FIG. 2 is a block diagram showing a configuration of the tagging part in the apparatus shown in FIG. 1.

In the above tagging part 4 image data including a character pattern recognized as a character in the character recognition part 3 is input. The image data are output to a character line selection part 11 to select one character line from character lines including the character pattern. With reference to FIG. 2, the selected character line is output to a keyword identification part 13 to store identification data due to an identification result, by identification of the character line with a keyword included in the relevant logical elements in the keyword dictionary, using the keyword dictionary where the options of the keyword corresponding to the logical element having a hierarchy structure are shown. The identification data has both of every group of characters and every corresponding tag in each line. The keyword dictionary is contained in a keyword dictionary part 12. Tagging by which a tag is given to each logical element arranged along a character line is implemented by the identification. Here, the logical element with a hierarchy structure is an element denoted by a business card having a structure such as name, affiliated organization and address as lower layer elements. In addition, the address has, for example, a zip code as the lower layer element. Moreover, the keywords denote business, project, center and so on, for example, when the logical element is a belonging department.

Next, when the character line has only one tag, the identification data is output to a tagging range extension part 14 to extend the tagging range, assuming that the tag is only one tag for whole the character line. In other words, the one tag applied to the character group that are arranged in a part of the line is rejected, and alternatively, one another tag of the tags to a new character group that are arranged in all of the line is applied, the one another tag having the same logical meaning as the one tag. Moreover, when there are any character lines without a tag given, a tag denoted by "Indecisive" is given to the character lines. After a tagging range is extended in a predetermined character line as shown above, a processing stage is returned to the character line selection part 11 again to select a new character line in the document, and to implement the above process for the new character line.

All of the character lines are checked to find character lines with two or more tags in one character line, and output to a division process part 15 to divide text blocks just before and just after the related character lines. And after the text block is divided, the text block including only the related line is generated to divide the text block and the character line at the boundary between the different tags. The above division process is repeated till there is one character line in a text block, and only one tag exists for one character line.

When, in all the character lines, tags given to the adjacent character lines are logically inconsistent with each other, the above tags are output to a tagging modification part 16 where they are replaced so that they are logically consistent with each other. In the tagging modification part 16, character lines to which it is impossible to give appropriate tags are output to an indecisive tag estimation part 17 to give appropriate tags by estimation with reference to a tag of the adjacent character lines. Moreover, the process in the indecisive tag estimation part 17 is applied to all the character lines, and repeated till there is no need to replace tags.

Then, when two adjacent character lines have the same tag, all the character lines are output to a character line combination part 18 to generate a text block in which the character lines are touched internally.

Further, each part of the apparatus for reading a document image will be described more in detail. In the document image input part 1, actual documents in a form of a paper medium is converted into image data with capability to be manipulated with a computer. Specifically, the document image input part 1 comprises an image scanner, a digital camera and so on as input apparatus.

The document converted into predetermined image data is converted into a bi-level image based on the document image, using various kinds of software packed in some items of the input apparatus, and pieces of pretreatment software for document structure analysis. Now, after the input direction of the documents indicating the character direction of the document image is detected, the direction is corrected to a desired direction by rotation and so on, and then the document image is supposed to be always input with no deviation from the character direction.

Figure 3A:
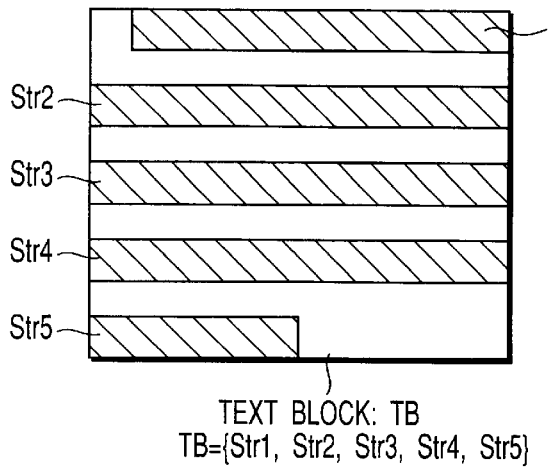
FIG. 3A is a schematic view showing an embodiment of character lines and text blocks in image data shown on a screen, used in the layout analysis part of the apparatus for reading a document image shown in FIG. 1.
Figure 3B:
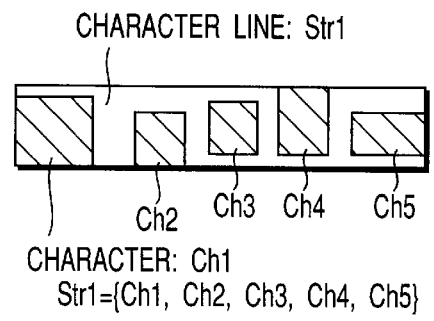
FIG. 3B is a schematic view showing an embodiment of a character line and characters in the character line shown on the screen, used in the layout analysis part of the apparatus for reading a document image shown in FIG. 1.
Figure 3C:
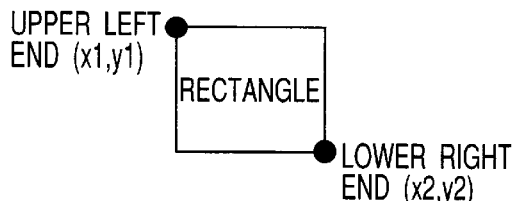
FIG. 3C is a schematic view showing coordinates indicating positions of characters in the image data shown on the screen, used in the layout analysis part of the apparatus for reading a document image shown in FIG. 1.

In the layout analysis part 2, information on the text block and the character line is extracted from the document image input from the document image input part 1. And the reading order is given to the text blocks and the character lines. Moreover, the above procedure is applied to documents mixed with vertical writing ones and horizontal writing ones. Now, the text block is a set of character lines, which are adjacent each other in a document element constituting the document data. And, the character line is a set of characters which are adjacent each other. For example, as shown in FIG. 3A, the text block includes character lines (Str1, Str2, Str3, Str4 and Str5), and forms the minimum rectangle (TB={Str1, Str2, Str3, Str4, Str5}) circumscribing the above character lines. As shown in FIG. 3B, the character line includes characters (Ch1, Ch2, Ch3, Ch4, and Ch5), and is composed of the minimum rectangle (Str1= {Ch1, Ch2, Ch3, Ch4, Ch5}) circumscribing the above characters. In addition, as shown in FIG. 3B, one character includes one character pattern, and forms a minimum rectangle in which the character pattern is circumscribed. Relations among the text blocks, character lines, and characters are expressed in a tree structure. That is, the character line has the text block as an upper-level position in the structure, and the character as a lower-level one in the structure (Hereinafter, the upper-level position in the structure just above a position in the structure is called as a master, and the lower-level one as a slave). Moreover, each rectangle may be expressed with the coordinates at the upper left and at the lower right ends as shown in FIG. 3C. In the character line of horizontal or vertical writing, the characters may be arranged in the reading order by sorting the coordinate values of X or Y at the upper left end in ascending order.

In the character recognition part 3, the character pattern representing the shape of each character is extracted from images showing the character lines obtained by layout analysis. The extracted character patterns are recognized as characters, and sequentially converted into character code information encoding the characters. In addition, the character patterns are converted into the character code information, and finally arranged in the reading order to output the character recognition results to the subsequent step. The character recognition method dedicated only for English is applied to the same character line as the line recognized as mentioned above to obtain similar character recognition results to the above results. In addition, the extracted character patterns are converted into the character code information, and finally arranged in the reading order as characters to output the character recognition results to the subsequent step. As mentioned above, in the character recognition part 3, a plurality of character recognition methods are independently applied to one character line information obtained by layout analysis to obtain a plurality of character recognition results. Though the character recognition part 3 process in Japanese and English has been described in the above, the above part may be configured to process in other languages. Thereby, a plurality of character recognition dictionaries (3-1, . . . , 3-N) are independently applied respectively to characters output every character line to improve the accuracy in the tagging results described below by combination and aggregation of the character recognition results. As mentioned above, in alphabetic character lines or numeric character lines to which character recognition dictionaries for Japanese are difficult to be applied, a tagging process using the outputs of character recognition dictionaries for English may cause highly accurate tagging results as the whole character line, in comparison with the case where only character recognition dictionaries for Japanese are used.

In the tagging part 4, characters finally arranged in the reading order after conversion into character code information in the character recognition part 3 are input. Tags corresponding to logical elements (name, affiliation, address and so on, for business cards) are given to text blocks comprising a plurality of character lines every text block, character line or character, and the tagged document image is output to the subsequent step. Moreover, the logical elements are exclusive, and then a plurality of tags are not given to one character.

Figure 4:
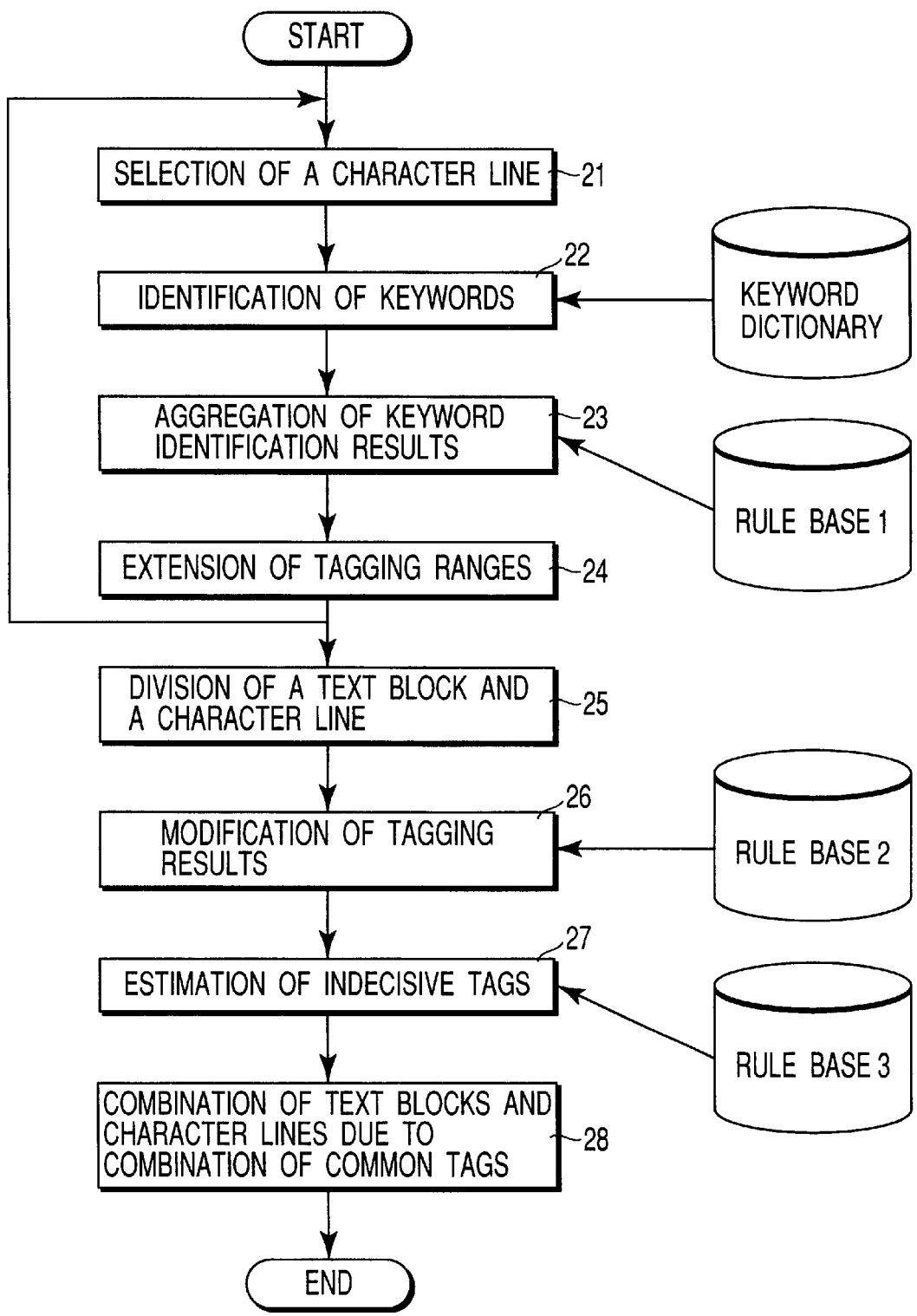
FIG. 4 is a flow chart showing a processing order in the tagging part of the apparatus for reading a document image shown in FIG. 1.

According to FIG. 4, in the tagging part 4, firstly, image data including character patterns from the character recognition part 3 are input for selection on one character line of the character lines including the character pattern line from the above image data (21). The selected character line is identified with the keyword included in a relevant logical element of a keyword dictionary, using the above keyword dictionary (22).

Figure 5:
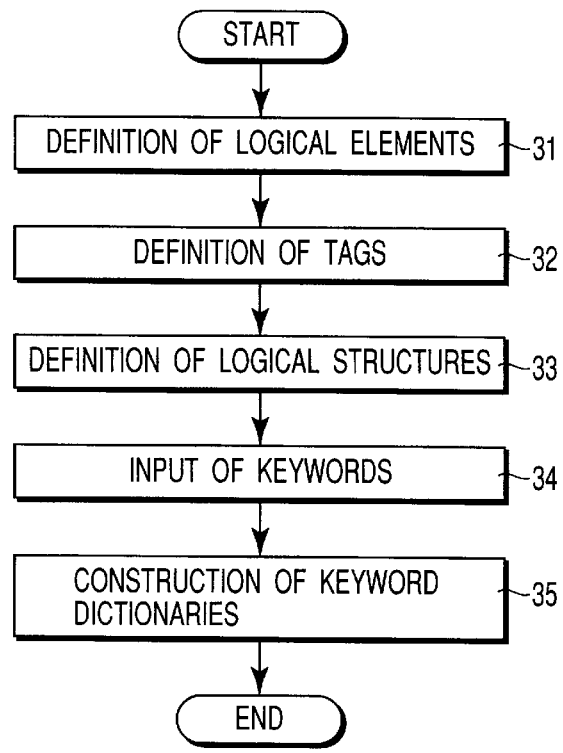
FIG. 5 is a flow chart showing a processing order for constructing a keyword dictionary used in a keyword dictionary part in the tagging part shown in FIG. 2.

Now, processes to make a keyword dictionary will be described referring to FIG. 5. Firstly, the user defines an arbitrary logical element (31), using the GUI, as shown in FIG. 6, to define a logical element. In the GUI, a name of each logical element, a tag name of a logical element (a starting tag name denoting a position to start the tag, and a terminating tag name denoting a position to terminate the tag), a master logical element, and a slave logical element are defined. When logical elements are defined as mentioned above to have a definite hierarchy structure among the logical elements, a list of logical elements in the same layer of the hierarchy may be displayed as shown in FIG. 7. And ordering among the above logical elements may be defined. For example, in a business card as an input document, logical elements of name, affiliated organization, belonging department, position, address, phone number, FAX number, email address, and homepage address are defined for a lower-level position (that is, slave) in the structure just under the most upper-level position logical element (Hereinafter, called as root) of a business card, that is, as a slave of the root, according to FIG. 7. When the above slaves are sequentially input to a template shown in FIG. 6, the logical elements in the same layer of the hierarchy may be ordered in the input order. For example, in the case of the address, logical elements as slaves may be defined in the order of zip code, state, city or town or village, and house number.

Then, tags are defined every defined logical element (32). That is, for a certain logical element, a tag is defined to be located between the starting tag and the terminating one. For example, in a business card as an input document, a tag set is defined as the following pair: starting tag </Name> and terminating tag of name <Name>, starting tag </Affiliation> and terminating tag of affiliation <Affiliation>, starting tag </Department> and terminating tag of department <Department>, starting tag </Position> and terminating tag of position <Position>, starting tag </Address> and terminating tag of address <Address>, starting tag </Phone> and terminating tag of phone number <Phone>, starting tag </FAX> and terminating tag of FAX number <FAX>, starting tag </Email_Address> and terminating tag of email address <Email_Address>, starting tag </HomePage_Address> and terminating tag of homepage address <HomePage_Address> and so on. In the present case, the tag form may be arbitrary, and is not limited to the form shown above here.

After tags are defined as mentioned above, a logical structure is defined (33). That is, from a plurality of logical elements in which the relation between the master and the slave is defined, the hierarchy structure among the above logical elements is decided. Firstly, logical elements having no master (that is, root) are extracted, it is displayed on the screen that a plurality of roots exist, when a plurality of roots are detected (in the present case, the hierarchy structure of a different root is supposed to be exclusive). The user changes the definition of the logical elements till the number of roots is one, or arranges roots in orders , Then, the logical elements as slave ones of the roots are extracted, all the logical elements are displayed on the screen, and the user performs ordering among the logical elements to arrange the logical elements to above ordering. Thereby, each layer composed of the hierarchy is extracted by sequential tracing of slaves of each logical element. That is, when it is assumed that the root is the primary layer of the hierarchy (the most upper-level layer of the hierarchy), the logical element as the slave of the primary layer becomes the secondary layer of the hierarchy, and furthermore, the logical element as the slave of the secondary layer becomes the tertiary layer of the hierarchy. In each layer, the logical elements are ordered by the user to be displayed in the ordering. When the above procedure is repeated for all the logical elements, layers included each logical element and the ordering of each logical element in every layer become obvious, and, then, a tree structure shown in FIG. 8 to specify the hierarchy structure of each logical element may be formed.

After the logical structure is defined as shown above, keywords are input every logical element (34). For example, templates are prepared every logical element as shown in FIG. 6. And the user inputs keywords appropriate for logical element names into a space of "Definition of Keyword" of the template. For example, keywords for Department may be defined as follows: Business, Project, Center, Group, Service, Solution Department, Solution Section, Factory, Headquarters, Branch, Graduate School, Director Room, Laboratory, Study Room, Research Department, Research Faculty, Faculty, Course, Head Office, Research Section, Exclusive Study, Division, General Office, Press Division, Bureau, Charge, Planning Office, Public Relations Office, Resident, Office, Division, Technical Division, Information division, Promotion Division, Sales Division, Management Division, Accounting Division, General Affairs Division, Development division, Supervision Division, Editorial Division, System Division, Broadcasting Division, Sales Division, Sales Section, Development Section, Sales office, Sales, Division One, Division Two, Division Three, Division Four, Division Five, Division Six, Division Seven, Division Eight, Division Nine, Section One, Section Two, Section Three, Section Four, Section Five, Section Six, Section Seven, Section Eight, Section Nine, Division 1, Division 2, Division 3, Division 4, Division 5, Division 6, Division 7, Division 8, Division 9, Section 1, Section 2, Section 3, Section 4, Section 5, Section 6, Section 7, Section 8, Section 9, The First Division, The Second Division, The Third Division, The Fourth Division, The Fifth Division, The Sixth Division, The Seventh Division, The Eighth Division, The Ninth Division, The 1st Division, The 2nd Division, The 3rd Division, The 4th Division, The 5th Division, The 6th Division, The 7th Division, The 8th Division, The 9th Division, The First Section, The Second Section, The Third Section, The Fourth Section, The Fifth Section, the Sixth Section, The Seventh Section, The Eighth Section, The Ninth Section, The 1st Section, The 2nd Section, The 3rd Section, The 4th Section, The 5th Section, The 6th Section, The 7th Section, The 8th Section, and The 9th Section. The above keywords are configured to be sequentially input into a template with a logical element name of Department as shown in FIG. 6. In another method, it may be possible that the character recognition process is applied to a large amount of documents, character recognition results of the actual keywords are collected beforehand, and keywords corresponding to the desired logical element names are extracted to be copied into templates. When the character recognition results are collected beforehand as shown above, in recognition of the keywords, for example, "Project" of an actual business card, many errors is often recognized improperly as "Broject", "Furoject", "Progect", "Prodjct" and so on. When there are many errors in recognition, improperly recognized keywords are configured to be registered as they are, and occurrence probability of each keyword (occurrence probability of a specific keyword=the number of occurrences of a specific keyword/the number of occurrences of all keyword) is obtained. Then, the keywords and the occurrence probabilities corresponding to the keywords are configured to be registered. Thereby, the tagging process with less error in character recognition may be realized.

The final process for constructing the keyword dictionary is to form the keyword dictionary based on the above results (35). Keywords defined every logical element are automatically sorted in a descending order of lengths of character lines, using a predetermined program. For character lines with the same length, they are sorted in an ascending (or descending) order of character codes. By the above processes, logical elements corresponding to character lines may be decided through identification of every character line with a plurality of keywords. In the above processes for the tagging process of every character line, a keyword most matching with characters in the character line is most preferred for sorting in principle to be located at the top of the selected options in identifications of every character line in the tagging process such as in the conversion technology from Kanas (the Japanese syllable characters) to Chinese characters.

By the keyword dictionary described above is used, every selected character line is identified with keywords included in the relevant logical elements of the keyword dictionary to store the identification data due to the identification results (23). Moreover, when this identification result is obtained, the identification mistake due to the recognition mistake is evaded to some degree. It is desirable that off-line correction operations by the user at the GUI 6 for correction of processed results may be reduced by a certain degree of prevention of recognition errors due to the identification errors. In order to achieve this, when a plurality of character candidates recognized every character pattern in the character recognition process have been obtained, a matrix where characters recognized by character patterns are arranged every character pattern according to candidate priority order, as shown in FIG. 9, may be used. In the above, identification is configured to be sequentially implemented from characters with high candidate priority. In the matrix, a row component denotes a candidate priority level of characters (in FIG. 9, the first place character recognition result, . . . , the Nth place character recognition result), and a column component denotes an index corresponding to different character pattern (in FIG. 9, the first, . . . , the fifth). Owing to the GUI 6 for correction of processed results obtained after tagging operation, identification errors due to recognition errors may be completely eliminated.

Based on the above identification results by the keyword dictionary, tagging operation to apply tags to each logical element existing in character lines is implemented. For more accurate tagging operation, a rule 1 to combine the logical elements is applied to the tagging results, if identification results of the same logical elements are adjacent each other or overlapped (a adjacent tag means that there is no other tags between two tags, and a overlapped tag means that a plurality of tags are given to one or more characters); a rule 2 to select one of different tags so as to make a tag with longer tag name selected from the different tags (tags with shorter tag name are rejected), if different tags are given to one line in an overlapped manner; and, a rule 3 to replace a tag of the second logical element with the same tag as the tag of the first and third logical elements, if the first, second, and third logical elements are consecutively given in the above line, the first and third logical elements are the same, and, the second logical element is different from the first and third logical elements. The above states before and after changing the tags are memorized in a rule base 1 which is a first memory.

Figure 10:
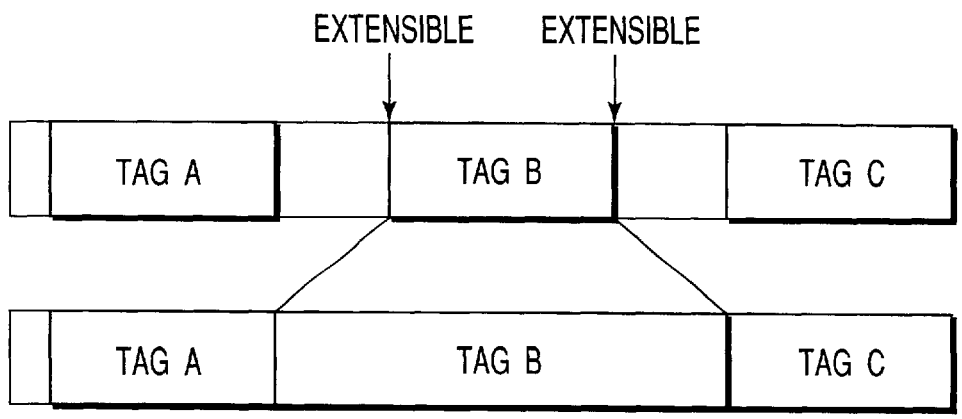
FIG. 10 is a schematic view showing an embodiment for extending tags in an extending process of a tagging range composed of the processing orders of the tagging part shown in FIG. 4.

By the identification results after the above application of the rules 1, 2, and 3, there is a case where some of the character lines have only one tag. When a tag is not one for the whole character line, the range of the tag is changed so that the tag is a tag for the whole line. That is, in the character line, the same tag as that in the character line is extended to be given to a part with no tag given (24). When there are a plurality of tags in one character line, and head and tail-end parts of a tag are extensible, the tagging range is extended like a tag B as shown in FIG. 10 so that the head part of the tag is extended to a tail-end part of the tag just before the present tag, and the tail-end part is extended to a head part of the tag just after the present tag. By introducing the above tagging range extension part 14, the identification may be processed without depending on the arrangement of characters in documents. Moreover, identification of unknown words and so on by combination of them into a new word may be processed.

After the tagging range is extended, the processes from step (21) to select a new character line to step (24) to extend the tagging range may be applied again for all the character lines in image data. When there are any character lines with no tags given, even after the above processes, a tag called as "Indecisive" is given to the above character lines with no tags given. Moreover, in each character line, the tags rejected when the above character lines are identified with keywords are stored as candidates, with the above tagging results.

After the above process is implemented, a text block and a character line are divided respectively (25). That is, if there are two or more tags in a character line, the text block is divided just before and after this line to generate a text block including only this line. In addition, text blocks and character lines are repeatedly divided at the boundary between different tags till there is one character line in one text block, and only one tag in one character.

By the above processes, image data where there is one character line in one text block, and only one tag in one character line is obtained. In the above image data, the tagging results are changed (26) so that the combination of tags of two adjacent character lines is not in logical contradiction. That is, when the combination of tags is in the "logical contradiction" as previously defined, a tag with higher priority of two tags is left, and a tag of being logically consistent with the tag with higher priority is selected from the candidate tags in the character lines having a tag with the lower priority. Then the tag with the lower priority is replaced with the tag of being logically consistent with the tag with higher priority. When there is no appropriate tag in the candidate tags, the tag with lower priority is rejected, and, instead, "Indecisive tag" is given. When a tag A and a tag B are arranged in series, and the tag B is rejected, the above procedure is described as (A, B)→(A), and the above description is stored in the second memory of a rule base 2. The priority is determined by priority which the user defines in the prepared tags. Or, tags with higher occurrence probability may be registered as one with higher priority by obtaining the occurrence probability of a tag (occurrence probability of a specific tag=the number of occurrences of a specific tag/the number of occurrences of all tags) and registering every tag and the occurrence probability corresponding to the each tag. Or, priority is previously determined between keywords, with reference to keywords as a base for tagging, and the priority among the keywords may be associated with the priority among tags corresponding to the keywords.

Then, an "Indecisive tag" given when the tagging results are changed is estimated (27). That is, the user has previously defined relation of adjacent tags with determined priority, and then, the indecisive tag is changed into an appropriate tag, referring to the above definition. The above processes are repeatedly applied to all the character lines with indecisive tags, till there is no replacement of tags. When tags are arranged, for example, as follows; a tag A, an indecisive tag, and a tag B, a procedure that the indecisive tag is regarded as a tag C may be described as (A, indecisive, B)→(A, C, B). And, the above description is stored in the third memory of a rule base 3.

Figure 11A:
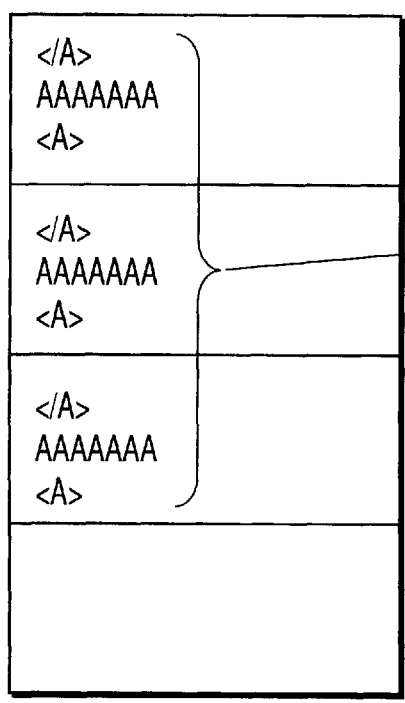
FIGS. 11A and 11B are a schematic view showing an embodiment in which character lines are combined into a text block in a text block and character line combination process by combination of a common tag in the processing orders of the tagging part shown in FIG. 4.
Figure 11B:
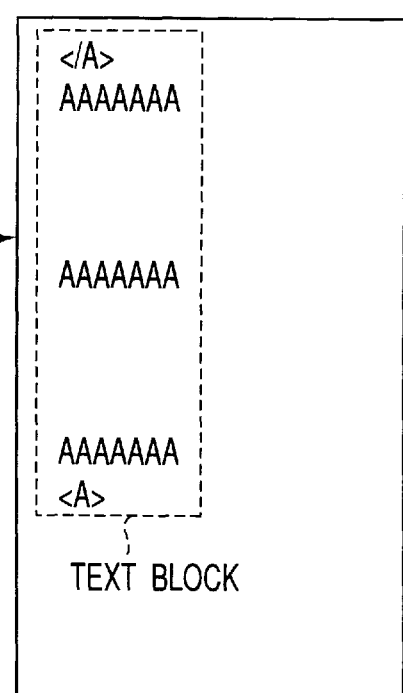

Then, when the two blocks of text blocks or character blocks (now, called as tag blocks, respectively) are adjacent each other and have the same tag, the two tag blocks are combined to generate a text block with the same tag as the previous one (28). The above processes are applied to all the tag blocks, which are adjacent each other and have the same tag. For example, when the adjacent three character lines have the same tag as shown in FIGS. 11A and 11B, the two adjacent character lines are combined to one text block, to which the same one tag as that before combination into one block is given. Subsequently, a character line adjacent the above text block, and the text block are combined to one text block, to which the same one tag as that before combination into one block is given. Thereby, three adjacent character lines with the same tag are combined into one text block with the same tag as that for the three character lines.

In the tagging result output part 5 to receive image data output from the tagging part 4, the tagging result is output to a desired document file, based on an output form previously defined. For example, when there is any hierarchy structure among tags, the hierarchy structure may be described with a tree structure. The tagging result of the input document is sequentially output from the root of the tree structure to logical elements of the lower layer of the hierarchy structure, and in the logical element of the same layer, the tagging result of the input document is output in the order of the definition beforehand. More particularly, in each logical element, a character recognition result is output in a form where the result is inserted between a starting tag and a terminating tag. When there are any layer having slave logical elements under a layer having master logical elements, the starting tag of the slave logical element, the character recognition result corresponding to the slave logical element, and the terminating tag of the slave logical element are inserted, one after another, just before the terminating tag of each master logical element. Besides, when there are any layer having slave logical elements of the above slave logical element, the starting tag of the slave logical element of the above slave logical element, the character recognition result, and the terminating tag are recursively inserted, one after another, before the terminating tag.

As another output form, an arbitrary logical element may be output in an arbitrary order. In this output form, the tagging result is output in sequentially writing the logical elements that is output in the output order to the empty template in an output order definition tool for ordering of the output logical element, for example, according to a tool of the similar form to the template shown in FIG. 7. According to the above output form where a business card is used as the input document, after the tagging process is applied to the logical element included in the business card, the logical element is read from the template one by one. The tag in coincidence with a tag corresponding to this read logical element is sequentially extracted from the processed result. This tag is output. In the above, all the tags in coincidence with the tag read out from the template may be output at a time, or the tags may be output sequentially one by one from the tag with a fixed order of letters used when writing a language (that is, in the order of hiragana in Japanese or alphabet in English). As another output form, the result information extracted from a business card image may be output, for example, in the following table form showing the logical element name and the read-out result:

Name: A B C D
Organization name: NIPPON CORPORATION
Department name: COMPUTER DIVISION
. . .

Arbitrary information to which arbitrary tag information is given may be output in a desired order and form by introducing the tagging result output part 5 shown above.

In the GUI 6 for correction of processed results obtained after operations at each part of apparatus for reading a document image according to the present invention, there may be a occasional common process that processed images after a process at each part may be displayed. This image parts that should be corrected may be found by the user's check of the images. Operations by a user may be implemented with correspondence to the contents that should be corrected. The desired image data at each process may be obtained by the operation of the user. However, since the content of the operation depends on each part, the content of the operation of the GUI 6 for correction of processed results after process at each part will be described below.

In the image output from the document image input part 1, it is possible to input the document to a computer again after check of the displayed bi-level image. As required, the user modifies a parameter defining the degree of bi-level. Moreover, if the normalized image is displayed and there are any detection errors in the inclination, a desired correction result for inclination may be obtained by user's direct specification of the inclination angle for correction.

Figure 13A:
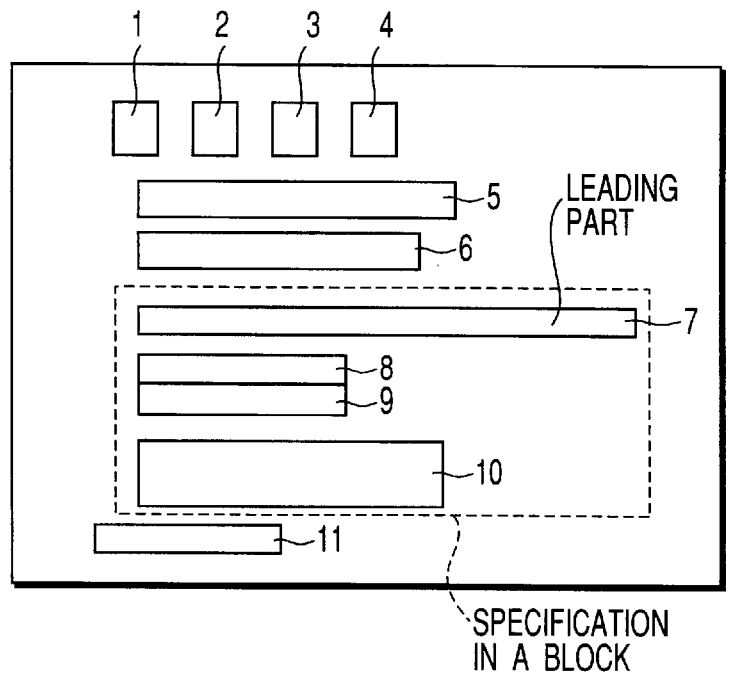
FIG. 13A is a schematic view showing an embodiment in which many character lines located at the left lower part of the business card shown in FIG. 12A are specified in a block, the user giving a number 7 to the leading part of the above character lines, that is, the address part, and the numbers from 8 to 10 are automatically given to the subsequent lines.
Figure 13B:
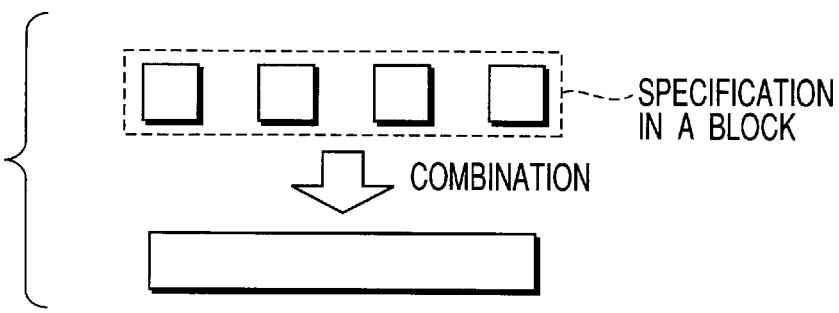
FIG. 13B is a schematic view showing an embodiment in which divided character lines denoting a part of name are combined into one line, in case that a name of the business card shown in FIG. 12A is divided into four character lines.
Figure 13C:
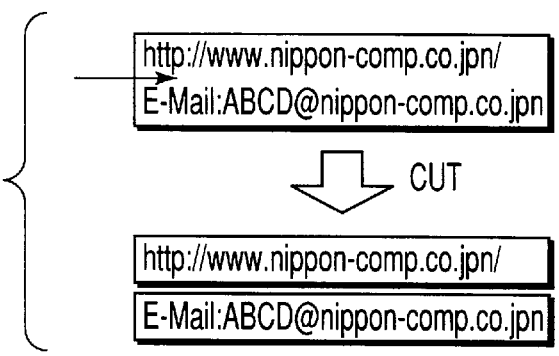
FIG. 13C is a schematic view showing an embodiment in which one character line combining a homepage address line and an electronic mail address line is divided into two separate respective lines, in case that the homepage and the electronic mail address lines are collectively extracted as one character line.

In the image output from the layout analysis part 2, processed results every character line ordered in the reading order are output as layout analysis results. For example, each character line of the business card shown in FIG. 12A is ordered every character line as shown in FIG. 12B, and the processed results are displayed on the screen. Moreover, the layout analysis results desired by the user are configured to be obtained by edition using a correction tool for correcting errors in the reading order, and the tool for correcting errors in line extraction. In the correction tool for correcting errors in the reading order, consecutive character lines may be specified as one block, and, it may be possible to give desired numbers to the leading part of the lines. Consecutive numbers may be automatically given to the character lines following the leading parts. For example, a plurality of character lines located at the middle part of the business card describing an address, a telephone and a facsimile (FAX) numbers of the business card shown in FIG. 12A are collectively specified, as shown in FIG. 13A. In addition, the user gives a number 7 to the leading part of the above character lines, that is, the address part, and then subsequent numbers from 8 to 10 are automatically given to the subsequent lines. When one character line is divided into many sections by misoperation, the correction tool for correcting errors in line extraction may be used. Then, all the character lines are instructed to be specified and combined by user. That is, the divided character line is combined into one line. For example, when the name part of the business card shown in FIG. 12A is divided into four character lines (1, 2, 3, 4) as shown in FIG. 13B, the divided character lines for the name part are combined into one line. Moreover, in another case, where the correction tool for correcting errors in line extraction may be used as same above case, there is the case where a plurality of character lines are collectively extracted as one character line. At that time, the user specifies a position between lines to divide the character line at the position. For example, when the character lines describing the home page address and the email address of the business card shown in FIG. 12A are extracted as one character line, the home page address and the email address are cut and divided into separate one character line, as shown in FIG. 13C. At this time, the user may select either a horizontal cutting direction or a vertical cutting direction.

In the image output from the character recognition part 3, the errors in character recognition of each character may be corrected every character line. The user sets the cursor to the part where there is an error in the character recognition, and inputs a correct character on the character input screen. When the user inputs a correct character, some options may be set to be displayed as candidates.

In the image output from the tagging part 4, the user may modify a tag every line, based on the tagging results every line displayed on the screen. For example, it is assumed that a plurality of tags are given to one character line obtained at the layout analysis, the character line is divided at the boundary between the tags in the tagging process, and only one tag is given to one character line. At that time, when one character line is erroneously divided into tag A and tag B by tagging misoperation, as shown in FIG. 14A, the character lines included in tag A and tag B are combined into one character line (with tag a) as shown in FIG. 14B. Thereby, a desired tag (in this case, tag a) may be given to the character line. Moreover, when the user puts the cursor on each character line, or specifies it with pointing apparatus, the list of the candidate tags is displayed at the specified position on the screen, and the user may select a desired tag that should be given. For example, when the user puts the cursor on the position where the telephone number and the FAX number of the business card shown in FIG. 15A have been described, the list of the candidate tags is displayed as shown in FIG. 15B, and the user may select a tag from the list with the cursor. Moreover, when the same tags are continuous, the tags and the character lines are combined into one block, and one text block may be displayed. For example, three character lines to which tag A is given as shown in FIG. 11A are combined into one text block as shown in FIG. 11B, and the user may give one tag A to the text block.

Since correct results may be always obtained by step by step use of the GUI 6 for correction of processed results, the procedures for operation of the system may be simplified by elimination of backtrack of the correction procedures. Thereby, it may be possible to obtain correct process results efficiently and reliably. In the above, the GUI has been set to be called at each process. However, if the GUI process is specified to be consecutively operated just after the process at the tagging result output part 5 as the final process, the GUI corresponding to the specified process may be activated. At this time, if temporary results at each process are output as intermediate files, the GUI corresponding to each process may be activated. That is, it is set to be able to return to each process which has already completed, and errors at each process may be corrected. When errors in a process are corrected, the process at the subsequent steps is automatically activated, and implemented based on the corrected results.

The GUI may be provided with templates to which texts may be input every logical element, the user may specify a partial image corresponding to the logical element with pointing apparatus, and it may be set to input the read results of partial images to the template by drag-and-drop.

More precise tagging results than those with only one character recognition dictionary may be obtained by the introduction of the tagging process with the recognition results by a plurality of character recognition dictionaries as shown above. Furthermore, in an environment where there are mixed a plurality of languages, arbitrary information to which tag information in an arbitrary form is given may be extracted with high accuracy. Moreover, reasonable processed results may be obtained by allowing the above tagging process based on simple rules, when keyword dictionaries are insufficiently formed (when there is any unknown keyword in the object process), or even when a correct tagging may not be implemented by errors in character recognition results.

Another embodiment of apparatus for reading a document image according to the present invention will be described, referring to FIG. 2, and FIGS. 16 through 18.

The present embodiment relates to the keyword identification part 13 in the tagging part 4 of the above embodiment. Other parts are same as those in the apparatus for reading a document image according to the above embodiment.

Figure 16:
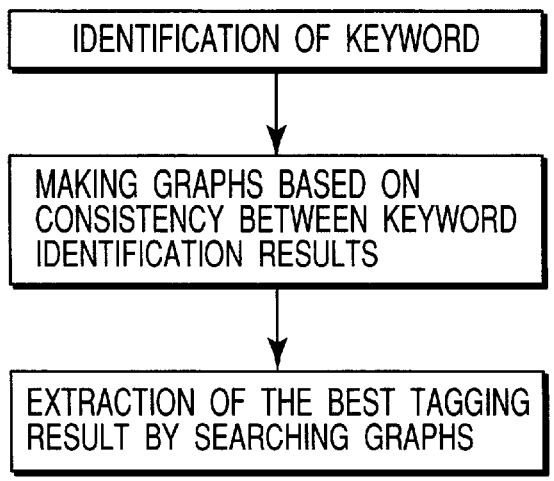
FIG. 16 is a flow chart showing a process for keyword identification in another embodiment of the apparatus for reading a document image according to the present invention.

In the above keyword dictionary part 12 of the above embodiment, keywords may be adequately determined by the process shown in FIG. 16, using an occurrence probability of keywords defined every keyword, and a tag may be given, more precisely.

Character lines selected by the character line selection part 11 are identified with keywords in keyword dictionary part 12, and characters in all the a document image may be converted into keywords. The occurrence probability is given to each keyword. Tags corresponding to the keywords are given to the keywords. The keywords extracted from the a document image may be selected, so that logical elements are not in contradiction each other by the above tags. That is, when tags for two keywords are different and overlapped, the keywords are not simultaneously selected. Or, when there is any keyword to which the rule 3 (if the first, second, and third logical elements are consecutively given in the above line, the first and third logical elements are the same, and, the second logical element is different from the first and second logical elements, a tag of the second logical element is replaced with the same tag as the tag of the first and third logical elements) shown in above embodiment can be applied, the keyword corresponding to the second logical element and the keyword to the first and third logical elements are not simultaneously selected. As described above, combinations of keywords simultaneously selected are searched as much as possible, a combination of keywords with the highest occurrence probability may be selected from the above combinations.

Figure 17:
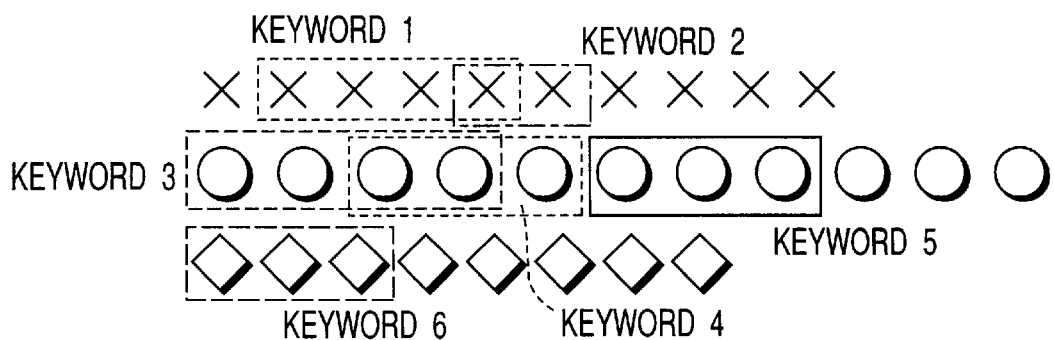
FIG. 17 is a schematic view showing an embodiment in which keywords are selected in the keyword identification process shown in FIG. 16.

More particularly, the keywords are firstly selected as shown in FIG. 17. In this FIG. 17, the occurrence probability of keyword 1, 2, 3, 4, 5 and 6 are 0.8, 0.3, 0.7, 0.5, 0.6 and 1.0 respectively.

As the keywords 1 & 2, and the keywords 3 & 4 are respectively overlapped in the present case, the keyword 1 & 2, and the keyword 3 & 4 are not selected at the same time, respectively. In addition, owing to the rule which is not simultaneously selected based on the above rule 3, the keywords 2 & 3, the keywords 4 & 5, the keywords 1 & 4, and the keywords 2 & 5 are also not selected at the same time, respectively. FIG. 18 clearly shows which combinations of keywords are simultaneously selected. In FIG. 18, combinations of keywords where they are connected each other by a line show that they may be simultaneously selected. And, all the occurrence probabilities of keywords which may be selected at the same time as a combination are summed up to obtain the total sum. When the total sums are calculated for all the cases where the combinations of keywords may be selected at the same time, the combination of keywords with the maximum total sum is the combination with the highest occurrence probability. Thereby, more precise tagging may be implemented, compared with the above embodiment.

Though the case where the occurrence probabilities shown in FIG. 17 are given in the keyword identification results is described, the cost in which occurrence probabilities may be converted into other values may be adopted.

A further another embodiment of apparatus for reading a document image according to the present invention will be described, referring to FIG. 2, and FIGS. 16 through 19.

The present embodiment relates to the keyword identification part 13 of the tagging part 4 according to the above embodiment. Other parts of the apparatus are same as those of the apparatus according to the above embodiment.

In the present embodiment, similarly to above embodiment according to the present invention, occurrence probabilities of keywords defined every keyword may be used at the above keyword dictionary part 12 of the above embodiment. And, owing to the process shown in FIG. 16, keywords may be more adequately defined to give tags more precisely.

In the present embodiment, it may be calculated which combination of keywords may be selected at the same time among keywords as shown in FIG. 18.

The feature of the present embodiment is that it may be decided which keywords may be selected, based on the assumption that the occurrence probability of a Nth tag depends on the occurrence of number (N−1) of tags just before the Nth tag. The feature means that keywords may be selected so that the highest occurrence probability of a tag column $W_1^n = \{W_1, \ldots, W_n\}$ is obtained. Now, the occurrence probability $P(W_1, \ldots, W_n)$ of the tag column $W_1^n = \{W_1, \ldots, W_n\}$ becomes $P(W_1, \ldots, W_n) = \Pi_{i=1}^{n} P(W_1|c_i)P(c_i|c_{i-1})$, by means of the N-gram class model used in a probabilistic language model, where $P(W_1|c_i)$: Probability of occurrence of keyword $W_1$ given to tag $c_i$, and $P(c_i|c_{i-1})$: Probability of occurrence of tag $c_i$ just after the tag $c_{i-1}$.

For example, when the technique of the present embodiment is applied to the document image shown in FIG. 17, keywords simultaneously selected are sequentially arranged as shown in FIG. 19. Moreover, in this embodiment, the occurrence probability of each keyword shown in FIG. 17 correspond to the probability of occurrence of a tag given to each keyword. The user previously defines the probability that a certain tag occurs just after a predetermined tag. Or, tags and the occurrence probabilities corresponding to the tags may be registered after obtaining a probability that a certain tag exists just after a predetermined tag (=the number of occurrences that a certain tag exists just after a predetermined tag/the number of occurrences that a arbitrary tag exists just after a predetermined tag).

As mentioned above, after calculation for all the cases where keywords are simultaneously selected, the combination of keywords with the highest occurrence probability may be obtained in the case where the occurrence probability is the highest. As, in the present embodiment, the probability that a certain tag occurs just after a predetermined tag is considered, in addition to the above technique described in the above embodiments, more precise tagging may be implemented, compared with the above embodiments.

According to the present invention, it may be possible that arbitrary information is extracted from printed document, arbitrary attribute information is given to the above information, and they are input to a computer system in an arbitrary order and form. Even when a plurality of languages are included in documents, and even when characters with a plurality of angle directions are described in character lines in case of input of documents into a computer system, precise processed results may be obtained and information extraction from extensive range of documents may be implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Apparatus for reading a document image including a plurality of character groups, each of the character groups having a logical element which indicates a particular logical meaning of the character group, said apparatus comprises:

means for memorizing keywords with relation to the logical element of the document image;

means for storing image data segments of the document image, each of the image data segments corresponding to each of the character groups having the logical element;

means for selecting one of the image data segments;

means for sequentially identifying each of the character groups in the image data segments with a corresponding one of the keywords extracted from said memorizing means; and means for sequentially applying one of tags to each of the character groups, the tags denoting a particular logical meaning related to one of the keywords, wherein said identifying means further comprises means for storing identification data which has both of every one of the character groups and every one of the corresponding tags in each of lines, the line composed of the character group and being a row of words, numbers, or other symbols on a page of writing or in print; and means for, when the line includes only one tag of the tags as a result of the identification data and when the one tag is applied to a character group that are arranged in a part of the line, replacing the one tag with another tag applied to a new character group that are arranged in all of the line, the another tag having the same logical meaning as the one tag.

2. The apparatus according to claim 1, wherein said replacing means includes means for, when there is at least one line with no tag given, applying a new tag having a predetermined name to the line.

3. The apparatus according to claim 1, wherein said replacing means includes means for, when the line includes a plurality of tags, and a range of the character group with one tag is extensible, extending the range from a head of the range to a tail-end of a range of an adjacent character group with another tag just before the range of the character group.

4. The apparatus according to claim 1, wherein said replacing means includes means for, when the line includes a plurality of tags, and a range of the character group with one tag is extensible, extending the range from a tail-end of the range to a head of a range of an adjacent character group with another tag just after the range of the character group.

5. The apparatus according to claim 1, wherein said replacing means further comprises means for, when each of the lines includes two or more tags of the tags as a result of the identification data, repeatedly dividing the each of the lines until each of the divided lines includes only one tag.

6. The apparatus according to claim 5, wherein said dividing means includes means for, after a character group which includes a set of the line adjacent to each other, and each of the lines are divided at boundaries among each of the character groups with different tags, repeatedly dividing the line until the character group includes only one line, and until only one tag is applied to the one line.

7. The apparatus according to claim 1, wherein said replacing means further comprises means for, when logical inconsistency exists in an arbitrary combination of some of the tags, as a result of the identification data, replacing each of the tags applied to the each of lines and each of adjacent tags adjacent to the each of the tags, with each of different tags from the tags and each of different adjacent tags from the adjacent tags respectively, the each of different tags and the each of different adjacent tags having each of appropriate logical meanings respectively so that the combination of some of the different tags and the different adjacent tags is logically consistent.

8. The apparatus according to claim 7, wherein said replacing means further comprises means for, when it is impossible to apply the each of the tags in said replacing means, applying an appropriate tag of the tags to the each of lines, the appropriate tag being estimated with reference to tags applied to the lines adjacent to the each of lines.

9. The apparatus according to claim 8, wherein said applying means includes means for implementing an estimation process for estimating the appropriate tag with respect to all of the lines; and means for repeating the estimation process until there is no need to replace the tag.

10. The apparatus according to claim 7, wherein said replacing means further comprises means for correcting the tag applied to every one of the lines by a user's instruction based on observation of the tag displayed on a display screen.

11. The apparatus according to claim 7, wherein said replacing means includes means for, when there is no tag to select so that the combination of some of the tags is logically consistent, applying a tag denoting that there is no candidate tag.

12. The apparatus according to claim 7, wherein said replacing means includes means for applying a priority level to a predetermined tag of the tags beforehand by a user's instruction; and means for replacing each of the tags based on the priority level.

13. The apparatus according to claim 7, wherein said replacing means further comprises means for replacing each of the tags with a candidate tag of higher priority having higher occurrence probability by calculating an occurrence probability of each of the tags, the occurrence probability being defined as a ratio of the number of occurrences of one of the tags to the number of occurrences of all of the tags.

14. The apparatus according to claim 7, wherein said replacing means further comprises means for modifying each of the tags by applying priorities beforehand among the keywords, and by regarding the priorities among the keywords as priorities among tags corresponding to the keywords.

15. Apparatus for reading a document image including a plurality of character groups, each of the character groups having a logical element which indicates a particular logical meaning of the character group, said apparatus comprises:

means for memorizing keywords with relation to the logical element of the document image;

means for storing image data segments of the document image, each of the image data segments corresponding to each of the character groups having the logical element;

means for selecting one of the image data segments;

means for sequentially identifying each of the character groups in the image data segments with corresponding one of the keywords extracted from said memorizing means;

means for sequentially applying one of tags to each of the character groups, the tags denoting a particular logical meaning related to one of the keywords;

means for storing identification data which has both of every one of the character groups and every one of the corresponding tags in each of lines, the line composed of the character group and being a row of words, numbers, or other symbols on a page of writing or in print;

means for, when the line includes only one tag of the tags as a result of the identification data and when the one tag is applied to a character group that are arranged in a part of the line, replacing the one tag with another tag applied to a new character group that are arranged in all of the line, the another tag having the same logical meaning as the one tag;

means for, when each of the lines includes two or more tags of the tags as a result of the identification data, repeatedly dividing the each of the lines until each of divided lines includes only one tag;

means for, when logical inconsistency exists in an arbitrary combination of some of the tags, as a result of the identification data, replacing each of the tags applied to the each of lines and each of adjacent tags adjacent to the each of the tags, with each of different tags from the tags and each of different adjacent tags from the adjacent tags respectively, the each of different tags and the each of different adjacent tags having each of appropriate logical meanings respectively so that the combination of some of the different tags and the different adjacent tags is logically consistent; and means for, when it is impossible to apply the each of the tags, applying an appropriate tag of the tags to the each of lines, the appropriate tag being estimated with reference to tags applied to the lines adjacent to the each of lines.

16. A method for reading a document image including a plurality of character groups, each of the character groups having a logical element which indicates a particular logical meaning of the character group, said method comprises:

memorizing keywords with relation to the logical element of the document image;

storing image data segments of the document image, each of the image data segments corresponding to each of the character groups having the logical element;

selecting one of the image data segments;

identifying sequentially each of the character groups in the image data segments with a corresponding one of the keywords extracted;

applying sequentially one of tags to each of the character groups, the tag denoting a particular logical meaning related to one of the keywords; and applying one or a combination of three following rules:
a first rule to combine same tags of the tags if the same tags are given to parts of the line adjacent to each other, or to a part of the line in an overlapped manner,
a second rule to select one of different tags of the tags based on a predetermined criterion if the different tags are given to a part of the line in an overlapped manner, and
a third rule to replace a second tag with the same tag as a first tag and a third tag if the first, second, and third tags are consecutively given in the line, the first and third tags are the same, and the second tag is different from the first and third tags.

* * * * *